United States Patent [19]

Fockens et al.

[11] Patent Number: 5,021,767
[45] Date of Patent: Jun. 4, 1991

[54] METHOD AND AN APPARATUS FOR ELECTRONICALLY IDENTIFYING ARTICLES MOVING ALONG A SURFACE

[75] Inventors: Tallienco W. H. Fockens; Jan Saeys, both of Eibergen, Netherlands

[73] Assignee: N.V. Nederlandsche Apparatenfabriek Nedap, De Groenlo, Netherlands

[21] Appl. No.: 256,615

[22] Filed: Oct. 12, 1988

[30] Foreign Application Priority Data

Oct. 12, 1987 [NL] Netherlands ................... 8702426

[51] Int. Cl.$^5$ .................. G08B 13/14; G06K 7/08
[52] U.S. Cl. ................... 340/572; 235/451; 340/505; 340/825.54
[58] Field of Search ............... 340/572, 505, 825.54, 340/825.72, 825.31, 825.32, 825.33; 235/451

[56] References Cited

U.S. PATENT DOCUMENTS

| | | | |
|---|---|---|---|
| 3,755,803 | 8/1973 | Cole et al. | 340/572 |
| 3,944,928 | 3/1976 | Augenblick et al. | 340/572 X |
| 4,196,418 | 4/1980 | Kip et al. | 340/825.54 X |
| 4,299,496 | 11/1981 | Lord | 340/686 X |
| 4,835,373 | 5/1989 | Adams et al. | 235/451 |
| 4,843,640 | 6/1989 | Juengel | 340/825.54 X |

FOREIGN PATENT DOCUMENTS

| | | |
|---|---|---|
| 0242906 | 10/1987 | European Pat. Off. . |
| 2447441 | 4/1976 | Fed. Rep. of Germany . |
| 2137781 | 10/1984 | United Kingdom . |
| WO86/04171 | 7/1986 | World Int. Prop. O. . |
| WO87/02161 | 4/1987 | World Int. Prop. O. . |

Primary Examiner—Joseph A. Orsino
Assistant Examiner—Thomas J. Mullen, Jr.
Attorney, Agent, or Firm—Fleit, Jacobson, Cohn, Price, Holman & Stern

[57] ABSTRACT

A method and an apparatus for identifying articles moving along a surface, especially suitable for conditions in which the surface and/or the articles comprise comparatively much electrically conductive material. The articles are provided with electronic responders, each having two electrodes which are insulated from each other and in operation, face the surface. The surface is provided with corresponding electrodes connected to a transmitter/receiver device. When the electrodes of a responder are located opposite the electrodes of the transmitter/receiver device, an electric field is produced between these electrodes, enabling information transfer between the responder and the transmitter/receiver device.

10 Claims, 1 Drawing Sheet

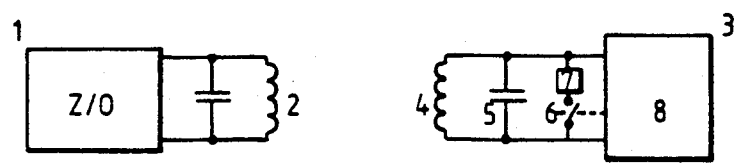
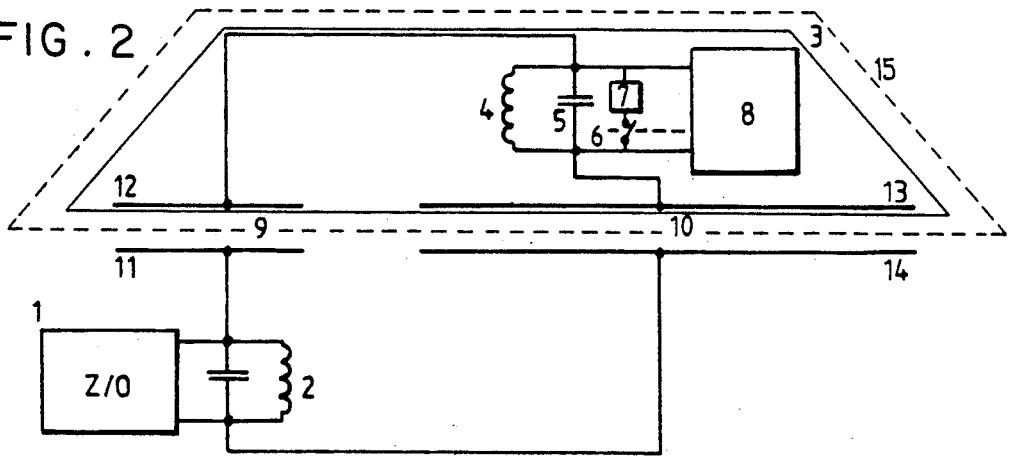
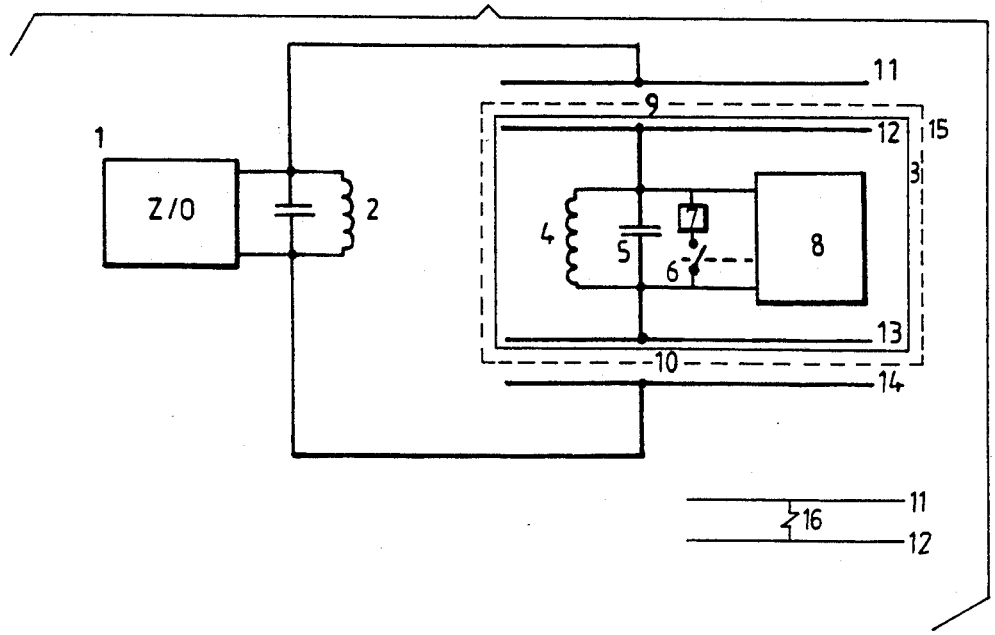

METHOD AND AN APPARATUS FOR ELECTRONICALLY IDENTIFYING ARTICLES MOVING ALONG A SURFACE

BACKGROUND OF THE INVENTION

1. Field of the Invention

This invention relates to a method of identifying through an electronic identification system articles moving along a surface, particularly suitable for identifying metal pallets or containers moving over a loading floor, each article to be identified being provided with an electronic responder comprising a receiver circuit, a switching means connected thereto and control means for the switching means.

The present invention further relates to an electronic identification system for identifying articles provided with an electronic responder and moving along a surface, suitable in particular for application in articles containing much metal and/or a surface containing much metal, each electronic responder comprising a receiver circuit, a switching means connected thereto and control means for controlling the switching means, there being provided at least one transmitter/receiver device having an output circuit. The present invention is e.g. highly suitable for automatically identifying metal pallets and containers, as employed by the various airline companies, the moment they enter or leave an airplane.

This automatic identification has the object to detect early whether the pallets and containers entering the airplane are to be transported actually to a destination of the airplane in question and whether they pertain to the planned cargo. At the same time, an optimum stowage of the airplane cargo can be achieved and thereby a minimum fuel consumption, because the dimensions and weights of the thus identified pallets and containers to be loaded are known. These data, after identification, can be supplied, automatically or otherwise, to the on-board computer.

By using identification, for articles upon entry and upon leaving the airplane and by processing these data via an onboard computer, it is achieved that the airline company is independent of the facilities present at the airport concerned for effecting an optimum loading.

In connection with the relatively large amount of information to be read from the pallets and containers, as well as in connection with the rather rough operating conditions in all weather, and also on account of the unknown orientation of the pallet or the container, it is obvious to use an electronic responder, which transmits programmable or non-programmable information by means of electromagnetic waves to a transmitter/receiver apparatus.

2. Description of the Prior Art

Examples of such identification systems are described in Dutch patent applications 77,11891 and 86,01021 of Applicants, which describe systems consisting of a transmitter/receiver unit with transmitter/receiver and aerial system, as well as an electrical responder with aerial having no supply of its own in the form of a battery but being supplied through the electromagnetic interrogation field of the transmitter/receiver.

One problem is, however, that the known identification systems cannot be used without more ado for identifying articles which are entirely or partly electrically conductive, such as metal pallets and containers, moving over a metal floor, such as an airplane floor. The metal parts disturb a magnetic field, while moreover between the underside of the pallets or containers and the floor, there is mostly no or insufficient room to install aerials above the floor or underneath the underside of the pallets or containers.

SUMMARY OF THE INVENTION

It is an object of the present invention to overcome this problem and in general to provide an effective method and apparatus for the electronic identification of articles in conditions wherein application of conventional techniques with magnetic fields are not suitable or less so.

To that effect, according to the present invention, a method of the above described type is characterized in that the surface is provided with at least two first, substantially platelike, interspaced electrodes electrically insulated relatively to one another, which are interconnected through a transmitter/receiver device of the electronic identification system; and that the receiver circuit of the responder is connected between at least two second, substantially platelike electrodes which are insulated relatively to each other and have an interspace corresponding with the interspace between the first electrodes; that the transmitter/receiver device is energized for generating at a predetermined operating frequency an AC voltage at the first electrodes; that the articles provided with electronic responders are moved along the surface in such a manner that at least temporarily a position is occupied in which the first electrodes are positioned opposite the second electrodes, whereby the opposed electrodes are coupled.

An electronic identification system of the above described type is characterized, according to the present invention, in that the output circuit of the transmitter/receiver device is connected between at least two first, substantially platelike electrodes insulated at an interspace from one another, and that the receiver circuit of a responder is connected between at least two second, substantially platelike electrodes insulated from one another, said second electrodes having an interspace corresponding with the interspace of the first electrodes.

BRIEF DESCRIPTION OF THE DRAWINGS

Some embodiments of the identification system according to the present invention will now be described, by way of example, with reference to the accompanying diagrammatic drawings, in which:

FIG. 1 shows an example of a known identification system;

FIG. 2 shows a first embodiment of an identification system according to the present invention; and FIG. 3 shows a second embodiment of an identification system according to the present invention, FIG. 3a shows galvanic contact between the electrodes.

DESCRIPTION OF THE PREFERRED EMBODIMENTS

FIG. 1 is a basic diagram of a known identification system showing at 1 the transmitter/receiver unit, at 2 the aerial system and at 3 the responder with aerial 4.

The responder aerial is a coil, which together with a capacitor 5 forms a resonant circuit being in resonance at operating frequency f of the transmitter/receiver unit. The electronic responder further includes an electronic switch 6 connected serially to a resistor 7, parallel to the resonant circuit consisting of coil 4 and capacitor 5. In operation, the electronic switch 6 is operated by a programmable or non-programmable code generator 8 and is adapted to impose an additional attenuation for the resonant circuit. As a result, the quality factor Q of the resonant circuit is modulated in the rhythm of the code to be transmitted, and so is the absorption of magnetic energy from the primary magnetic field of the transmitter/receiver aerial. By detecting this modulation in the absorption with the transmitter/receiver, the code of the electronic responder can be read in the transmitter/receiver unit. It is necessary for the proper operation of such identification systems based on inductive magnetic coupling that the coil of the transmitter/receiver unit couples magnetically with the coil of the electronic responder.

To identify a pallet or container 15 passing through the doorway of an airplane by the above method, it is necessary that e.g. an aerial is installed in the floor of the airplane and that a responder is placed in the pallet or container 15. The latter should be effected preferably in the centre of the pallet or container 15, because during lashing up of the cargo, the edges of a pallet often tend to curve upwards, so that the distance between a responder fitted in the edge and a coil possibly installed in the floor is not well defined. Furthermore, when a responder 4 placed in the centre, the orientation or position of the pallet or container 15 is of no further significance for the operation of the identification system. If a transmitter/receiver coil should be installed on the loading floor of an airplane, the electromagnetic field of this coil would be strongly attenuated by circular currents in the aluminum floor plates.

The latter could be eliminated by replacing the existing floor plates at the doorways by e.g. synthetic plastics floor plates with integrated aerials. However, this requires modification of the airplane construction and expensive admission procedures before the various airline authorities.

It is an object of the present invention to provide a system in which a contactlessly operating identification system can be incorporated in practically all existing cargo planes, without the necessity of modifying the construction of the floor plates of these airplanes for the purpose.

To that effect according to the present invention, there is effected a coupling via a substantially electric field instead of via a substantially magnetic field between the transmitter/receiver and the responder incorporated in the pallet or container. This electric capacitive coupling, as shown in FIG. 2, is effected by two electrode pairs 9,10. The transmitter/receiver is connected between the first electrodes 11,14 of each pair and the responder is connected between the other electrodes 12,13 of each electrode pair, while in a manner similar to the case of the substantially magnetic coupling, use is made of absorption of energy from the primary electric field so as to transmit the information from the responder to the transmitter/receiver device.

The first electrode pair is formed by an insulated conductor 11 installed on the aluminum loading floor in or adjacent the doorway of the airplane and an insulated conductor 12 of the responder installed in the centre of the pallet or container 15. When the pallet or container passes through the doorway, conductor 12 occupies for some time a position directly opposite electrode 11 disposed on the loading floor along substantially the entire width of the door.

The second electrode pair can be formed advantageously by the bottom of the pallet or container 13 and the loading floor of the airplane 14. When non-metallic pallets are used, a separate electrode 13 is to be fitted in a suitable place on the pallet. In this manner, the transmitter/receiver and the responder are electrically and capacitively coupled through electrode pair 9,10 for a short period but sufficiently long for transmitting the information stored in the responder to the transmitter/receiver. In both the transmitter/receiver and the responder, the electrodes may or may not be connected to a resonant circuit, as shown, so as to obtain sufficient oscillation even in the event of small-sized electrodes. The pallets and containers can be moved in a simple manner in all directions over the loading floors of the airplane, because these loading floors contain rolls and ball guides extending a few millimeters above said loading floors. The space remaining between the underside of the pallet or container 15, resting on the rolls and the ball guides, and the top of the aluminum loading floor is sufficient to install an insulated electrode on said loading floor, so that no constructive modifications in the loading floor are necessary.

In the event that the pallets, the containers or the loading floors, e.g. for alternative applications, are made from wood or synthetic plastics materials, instead of from electrically conductive material, it is naturally also possible to install the second electrode pair next to, or concentrically about, the first electrode pair, to thereby close the electric circuit.

According to another embodiment of the present invention, the electrode pair of the responder may be disposed on either side of said responder, as shown in FIG. 3, in which arrangement, during identification, the responder moves between an electrode pair of the transmitter/receiver. In connection with the cargo, this is, in most cases, probably not a practical solution for a pallet, but such a configuration could be used quite well for a container.

An entirely different application of the latter embodiment for instance resides in a flat responder, in the form of e.g. a credit card, in which the electrodes of the responder are disposed on either side of the card. The electrodes of the transmitter/receiver in this embodiment can be mounted in the walls of a kind of letter-box, wherein the card is to be inserted so as to transmit the information stored therein contactlessly to the transmitter/receiver.

In all above defined embodiments, the electric circuit can be dimensioned in such a manner that, in addition to a capacitive coupling, the electrode pairs may form a more or less reliable galvanic connection without disturbing the proper operation of the responder and hence the transfer of the information.

The electrode pairs 11,12, and 13,14, respectively, are then in fact bridged by a resistor 16, see FIG. 3. This is e.g. the case for electrodes 13,14 with the pallets and containers rolling over the above described rolls and ball guides, and used for the transport of air freight.

It is observed that the application of the present invention is not restricted to aviation but can take place wherever metallic or non-metallic articles moving over metal floors are to be identified, or the application of an identification system based on inductive coupling meets with objections.

The electrodes can be formed advantageously from flat plate material but may be curved for instance for special applications. Gridlike electrodes may be used as well.

Such and other variants are deemed to fall within the scope of the present invention.

I claim:

1. A method of identifying through an electronic identification system articles moving along a surface, particularly suitable for identifying metal pallets or containers moving over a loading floor, each article to be identified being provided with an electronic responder comprising a receiver circuit, a switching means connected thereto and control means for the switching means, comprising the steps of: providing the surface with at least two first, substantially platelike, interspaced electrodes electrically insulated relatively to one another, which are interconnected through a transmitter/receiver device of the electronic identification system; connecting the receiver circuit of the responder between at least two second substantially platelike electrodes which are insulated relatively to each other and have an interspace corresponding with the interspace between the first electrodes; energizing the transmitter/receiver device for generating at a predetermined operating frequency an AC voltage at the first electrodes; and providing the articles with electronic responders which are moved along the surface in such a manner that, at least temporarily, a position is occupied in which the first electrodes are positioned opposite the second electrodes, whereby the opposed electrodes are coupled.

2. A method as claimed in claim 1, further comprising the steps of arranging a platelike, electrode on a metal surface in an insulated manner and connecting the transmitter/receiver device between the platelike electrode and the metal surface to form the two first electrodes.

3. A method as claimed in claim 1 further comprising the steps of mounting a responder including a platelike electrode on or in a metal article in an insulated manner and connecting the metal article itself as the other electrode to the responder to form the two second electrodes.

4. A method as claimed in claim 1, further comprising the step of providing the responder on either side of a platelike electrode, wherein the two first electrodes are substantially parallel, platelike members.

5. An electronic identification system for identifying articles provided with an electronic responder and moving along a surface, suitable in particular for application in articles containing much metal and/or a surface containing much metal, each electronic responder comprising a receiver circuit, a switching means connected thereto and control means for controlling the switching means, there being provided at least one transmitter/receiver device having an output circuit, characterized in that the output circuit of the transmitter/receiver device is connected between at least two first, substantially platelike electrodes insulated from one another at an interspace, and that the receiver circuit of a responder is connected between at least two second substantially platelike electrodes insulated from one another, said second electrodes having an interspace corresponding with the interspace of the first electrodes.

6. An electronic identification system according to claim 5, adapted to identify metal pallets or containers moving over a floor, characterized in that each pallet or container to be identified is provided with a responder including an electrode, said responder being mounted in or on the bottom in an insulated manner, and that the bottom is connected as the second electrode of the responder to the input circuit of the responder.

7. An electronic identification system according to claim 5, adapted to identify articles moving along a metal surface, characterized in that the two first electrodes are formed by a platelike electrode mounted on the surface in an insulated manner and by at least a part of the surface itself.

8. An electronic identification system as claimed in claim 5, characterized in that the two first electrodes have spaced apart, opposite surfaces defining a gap between them, and that the two second electrodes are disposed on either side of an article which can move through said gap.

9. An electronic identification system as claimed in claim 8, characterized in that the gap between the two second electrodes is slit-shaped and that the article has the form of a card.

10. An electronic identification system as claimed in claim 5, characterized in that the output circuit of the transmitter/receiver device and the input circuit of the responders are dimensioned in such a manner that a galvanic contact between one of the first electrodes and one of the second electrodes does not disturb the identification.

* * * * *